United States Patent
Burks et al.

(10) Patent No.: US 9,203,698 B2
(45) Date of Patent: *Dec. 1, 2015

(54) REMOTE VERIFICATION FOR CONFIGURATION UPDATES

(71) Applicant: MOBILE IRON, INC., Mountain View, CA (US)

(72) Inventors: Timothy Michael Burks, Los Altos, CA (US); Sandilya Garimella, San Jose, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,150

(22) Filed: Sep. 11, 2014

(65) Prior Publication Data

US 2015/0126172 A1    May 7, 2015

Related U.S. Application Data

(63) Continuation of application No. 12/470,359, filed on May 21, 2009, now Pat. No. 8,898,748.

(51) Int. Cl.
| | | |
|---|---|---|
| *H04L 12/24* | (2006.01) | |
| *G06F 9/445* | (2006.01) | |
| *H04W 12/08* | (2009.01) | |
| *H04L 29/08* | (2006.01) | |
| *H04L 29/06* | (2006.01) | |
| *H04W 8/24* | (2009.01) | |
| *H04W 24/02* | (2009.01) | |
| *H04W 76/02* | (2009.01) | |

(52) U.S. Cl.
CPC ............ *H04L 41/082* (2013.01); *G06F 9/4451* (2013.01); *G06F 9/44505* (2013.01); *H04L 67/125* (2013.01); *H04W 12/08* (2013.01); *H04L 63/168* (2013.01); *H04W 8/245* (2013.01); *H04W 24/02* (2013.01); *H04W 76/02* (2013.01)

(58) Field of Classification Search
None
See application file for complete search history.

*Primary Examiner* — David Le
(74) *Attorney, Agent, or Firm* — Van Pelt, Yi & James LLP

(57) ABSTRACT

In various embodiments, a control client is configured to determine whether or not the most current configuration profile has been installed within a corresponding mobile device. In particular embodiments, the client is configured to store its own copy of a configuration profile and to compare its copy with the most current configuration profile generated by a device management system as well as to the configuration profile currently installed and applied by a configuration manager within the mobile device. Each configuration profile includes an embedded verification token that facilitates this process. Furthermore, the client may be configured to inform the device management system as to whether or not the current configuration profile has been installed. The device management system may govern enterprise access by the mobile device based on whether or not the current configuration profile has been installed.

20 Claims, 4 Drawing Sheets

REMOTE VERIFICATION FOR CONFIGURATION UPDATES

CROSS REFERENCE TO OTHER APPLICATIONS

This application is a continuation of co-pending U.S. patent application Ser. No. 12/470,359, entitled REMOTE VERIFICATION FOR CONFIGURATION UPDATES filed May 21, 2009, which is incorporated herein by reference for all purposes.

TECHNICAL FIELD

This disclosure relates generally to mobile devices and mobile device management systems.

BACKGROUND

In a manner similar to personal computers and laptops, business enterprises (e.g., companies, corporations, etc.) increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by employees in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting.

DESCRIPTION OF EXAMPLE EMBODIMENTS

Particular embodiments of the present disclosure provide methods, apparatuses and systems directed to providing remote verification for configuration updates.

In particular embodiments, a mobile device management application hosted at a device management server generates and distributes configuration profiles for mobile devices registered with an enterprise. In particular embodiments, each of the mobile devices registered with the enterprise includes a control client application (hereinafter referred to as a "control client" or "client") that is configured to interact with the device management application via the device management server and a network link. More particularly, the control client is configured to determine whether or not the most current configuration profile has been installed within the corresponding mobile device. In various example embodiments, the client is configured to store its own copy of a configuration profile and to compare its copy with the most current configuration profile generated by the device management application as well as to the configuration profile currently installed and applied by a configuration manager within the mobile device. In particular embodiments, each configuration profile includes an embedded verification token that facilitates this process. Furthermore, in particular embodiments the client is configured to inform the device management server as to whether or not the current configuration profile has been successfully installed and applied. In this manner, the device management server can verify that the current configuration profile has been successfully applied in the mobile device and govern enterprise access by the mobile device based on whether or not the current configuration profile has been applied.

Figure 1:
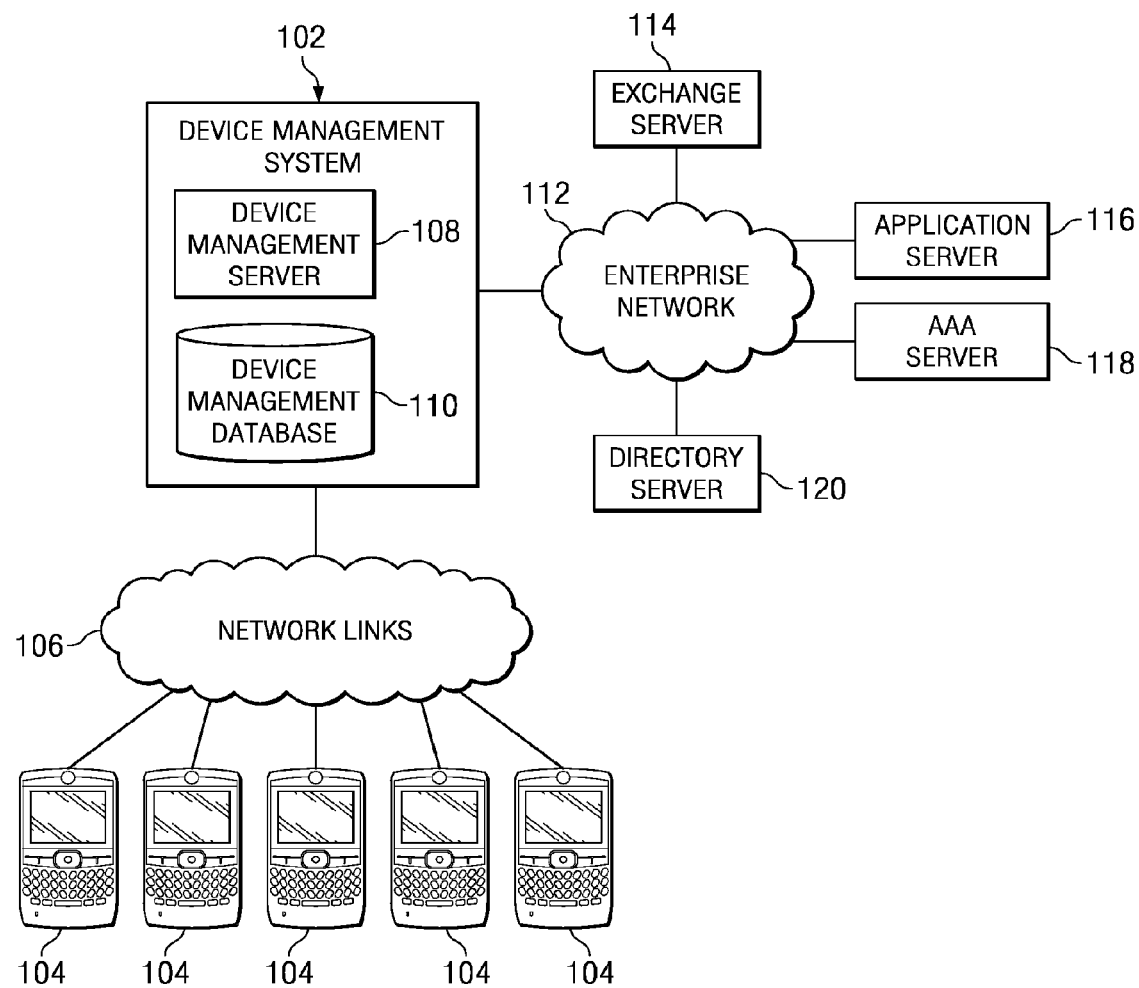
FIG. 1 illustrates an example mobile device management architecture according to an embodiment of the present disclosure.

FIG. 1 illustrates a block diagram of a computer network environment 100 in accordance with an example embodiment. Computer network environment 100 includes a device management system 102 and a plurality of mobile devices 104 that may each communicate with device management system 102 via one or more network links 106. In various embodiments, device management system 102 may actually comprise one or more device management servers 108 and one or more device management databases 110, one or more of which may or may not be physically located within the physical boundaries of the enterprise.

Network link(s) 106 may include any suitable number or arrangement of interconnected networks including both wired and wireless networks. By way of example, a wireless communication network link over which mobile devices 104 communicate may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link 106 may further include, or alternately include, a variety of communication channels and networks such as WLAN/WiFi, WiMAX, Wide Area Networks (WANs), and BlueTooth.

As FIG. 1 illustrates, device management system 102 may be operably connected with (or included within) an enterprise network 112 (which may include or be a part of network link(s) 106). Enterprise network 112 may further include one or more of email or exchange servers 114, enterprise application servers 116, authentication (AAA) servers 118, directory servers 120, Virtual Private Network (VPN) gateways, firewalls, among other servers and components. The mobile devices 104 may access or utilize one or more of these enterprise systems or associated functionality.

Figure 2:
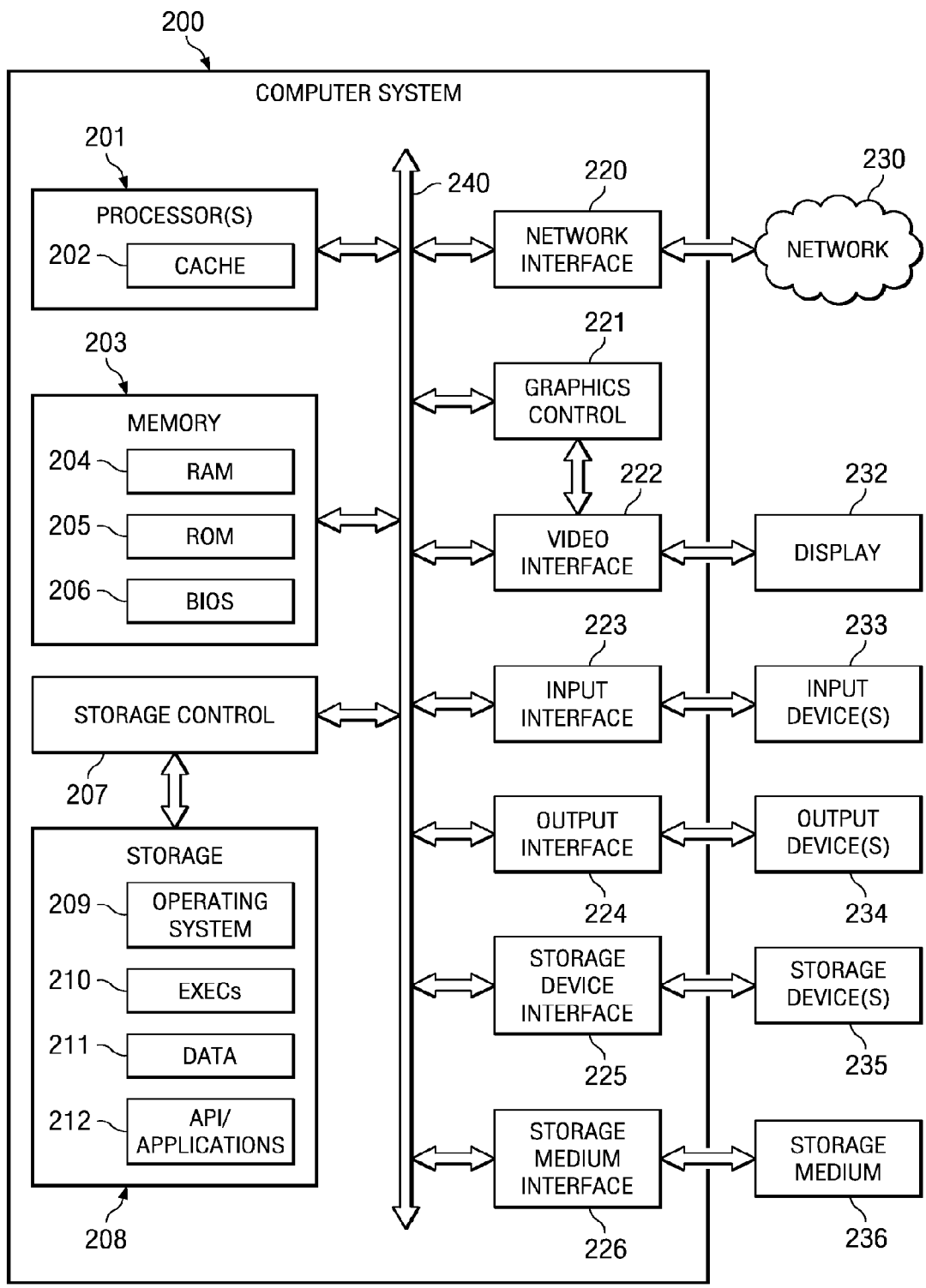
FIG. 2 is a schematic diagram illustrating an example server system architecture.

Device management system 102 may actually include one or more hardware, firmware, and software components residing at one or more computer servers or systems (hereinafter referred to as computer systems). Software components of device management system 102 may be at one or more of the same computer systems. FIG. 2 illustrates an example computer system 200. Device management system 102 may include software components at one or more computer systems, which may be similar to example computer system 200. Particular embodiments may implement various functions of device management system 102 as hardware, software, or a combination of hardware and software. As an example and not by way of limitation, one or more computer systems may execute particular logic or software to perform one or more steps of one or more processes described or illustrated with respect to device management system 102. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more tangible computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. A tangible computer-readable medium may include one or more nanometer-scale components or otherwise embody nanometer-scale design or fabrication. Example tangible computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

The components in FIG. 2 are examples only and do not limit the scope of use or functionality of any hardware, software, embedded logic component, or a combination of two or more such components implementing particular embodiments. Computer system 200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 200 may include a display 232, one or more input devices 233 (which may, for example, include a keypad, a keyboard, a mouse, a stylus, etc.), one or more output devices 234, one or more storage devices 235, and various tangible storage media 236.

Bus 240 connects a wide variety of subsystems. Herein, reference to a bus may encompass one or more digital signal lines serving a common function, where appropriate. Bus 240 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 201 (or central processing unit(s) (CPU(s))) optionally contains a cache memory unit 202 for temporary local storage of instructions, data, or computer addresses. Processor(s) 201 are coupled to tangible storage devices including memory 203. Memory 203 may include random access memory (RAM) 204 and read-only memory (ROM) 205. ROM 205 may act to communicate data and instructions unidirectionally to processor(s) 201, and RAM 704 may act to communicate data and instructions bidirectionally with processor(s) 201. ROM 205 and RAM 204 may include any suitable tangible computer-readable media described below. Fixed storage 208 is connected bidirectionally to processor(s) 201, optionally through storage control unit 207. Fixed storage 208 provides additional data storage capacity and may also include any suitable tangible computer-readable media described. Storage 208 may be used to store operating system 209, EXECs 210, data 211, application programs 212, and the like. Typically, storage 208 is a secondary storage medium (such as a hard disk) that is slower than primary storage. Information in storage 208 may, in appropriate cases, be incorporated as virtual memory in memory 203.

Processor(s) 201 is connected to multiple interfaces, such as graphics control 221, video interface 222, input interface 223, output interface 224, storage interface 225, and storage medium interface 226. These interfaces are in turn connected to appropriate devices, as may be illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer system, or other suitable I/O device or a combination of two or more such I/O devices. Processor(s) 201 may connect to another computer system or to telecommunications network 230 (which may include network link 106 or enterprise network 110) through network interface 220. With network interface 220, CPU 201 may communicate with network 230 in the course of performing one or more steps of one or more processes described or illustrated herein, according to particular needs. Moreover, one or more steps of one or more processes described or illustrated herein may execute solely at CPU 201. In addition or as an alternative, one or more steps of one or more processes described or illustrated herein may execute at multiple CPUs 201 that are remote from each other across network 230.

In particular embodiments, when computer system 200 is connected to network 230, computer system 200 may communicate with other devices, specifically mobile devices 104 and enterprise systems, connected to network 230. Communications to and from computer system 200 may be sent through network interface 220. For example, network interface 220 may receive incoming communications (such as requests or responses from other devices) in the form of one or more packets (such as Internet Protocol (IP) packets) from network 230 and computer system 200 may store the incoming communications in memory 203 for processing. Computer system 200 may similarly store outgoing communications (such as requests or responses to other devices) in the form of one or more packets in memory 203 and communicated to network 230 from network interface 220. Processor(s) 201 may access these communication packets stored in memory 203 for processing.

Computer system 200 may provide functionality as a result of processor(s) 201 executing software embodied in one or more tangible computer-readable storage media, such as memory 203, storage 208, storage devices 235, and/or storage medium 236. The computer-readable media may store software that implements particular embodiments, and processor(s) 201 may execute the software. Memory 203 may read the software from one or more other computer-readable media (such as mass storage device(s) 235, 236) or from one or more other sources through a suitable interface, such as network interface 220. The software may cause processor(s) 201 to carry out one or more processes or one or more steps of one or more processes described or illustrated herein. Carrying out such processes or steps may include defining data structures stored in memory 203 and modifying the data structures as directed by the software. In addition or as an alternative, computer system 200 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

In particular embodiments, a mobile device 104 is a wireless phone such as a mobile or cellular phone. By way of example, mobile device 104 may be a smartphone (e.g., the iPhone or iPhone 3G manufactured by Apple Inc. of Cupertino, Calif., the BlackBerry manufactured by Research in Motion (RIM), the G1 based on the Android operating system, or Samsung BlackJack based on the Windows Mobile operating system), feature phone, basic cellular phone, personal digital assistant, or other multimedia device. In particular embodiments, the mobile device 104 is an iPhone. The iPhone is an internet-connected multimedia smartphone designed and marketed by Apple Inc. of Cupertino, Calif. The iPhone generally includes functionality such as text messaging, voicemail, media player, and internet client including email functionality, web-browsing functionality, and local Wi-Fi connectivity. The original first generation iPhone hardware utilized quad-band GSM with EDGE while the second generation iPhone 3G added UMTS with HSDPA. The iPhone may run the iPhone OS 2.2.1 operating system as well as earlier versions and later versions (e.g., iPhone OS 3.0 released in 2009). Additionally, mobile device 104 may be affiliated with and supported by any suitable carrier or network service provider such as, by way of example, Sprint PCS, T-Mobile, Verizon, AT&T, or other suitable carrier.

Figure 3:
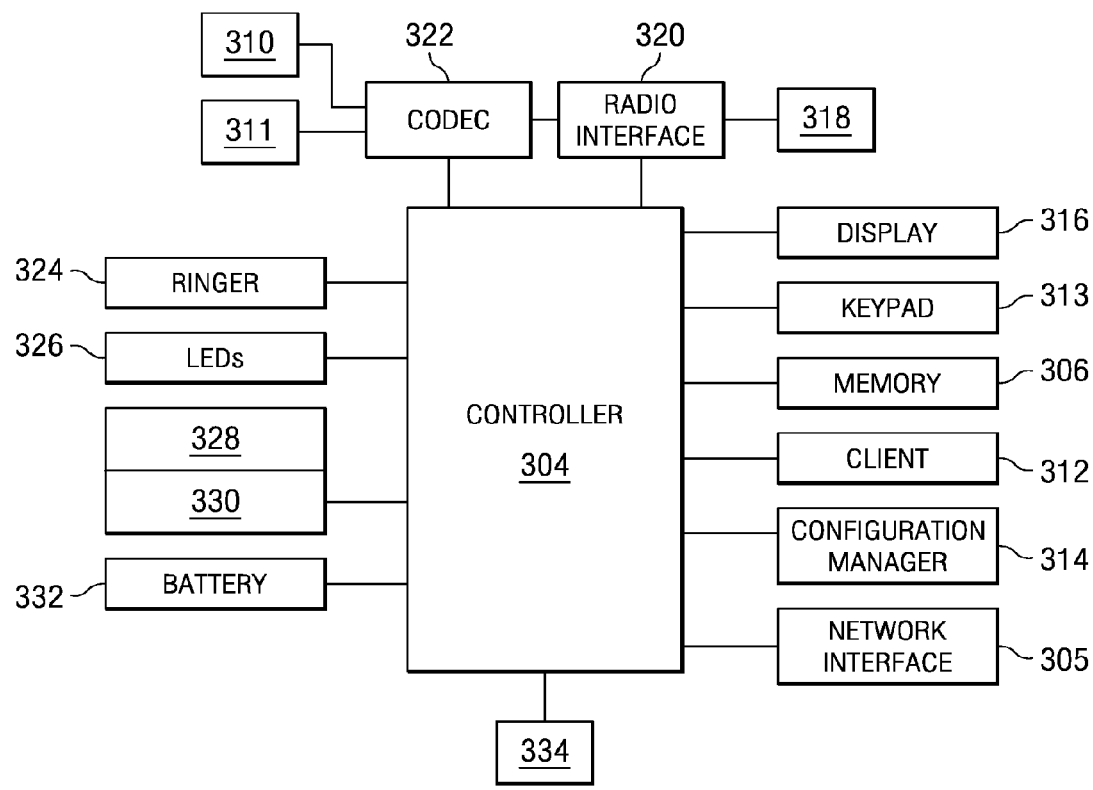
FIG. 3 is a schematic diagram illustrating an example mobile device system architecture.

FIG. 3 shows a schematic representation of the main components of an example mobile device 104, according to various particular embodiments, which is adapted for use in connection with a GSM network or any other mobile telephone network as described above, and which may also be configured to meet the wireless application protocol specification (WAP). Mobile device 104 generally includes a controller 304 which may comprise a microcontroller or one or more processors configured to execute instructions and to carry out operations associated with mobile device 104. In various embodiments, controller 304 may be implemented as a single-chip, multiple chips and/or other electrical components including one or more integrated circuits and printed circuit boards. Controller 304 may optionally contain a cache memory unit for temporary local storage of instructions, data, or computer addresses. By way of example, using instructions retrieved from memory, controller 304 may control the reception and manipulation of input and output data between components of mobile device 104. Controller 304 together with a suitable operating system may operate to execute instructions in the form of computer code and produce and use data. The operating system, other computer code (including control client 312 and configuration manager 314 described below) and/or data may be physically stored within a memory block 306 that is operatively coupled to controller 304.

Memory block 306 encompasses one or more storage mediums and generally provides a place to store computer code (e.g., software and/or firmware) and data that are used by mobile device 104. By way of example, memory block 306 may include various tangible computer-readable storage media including Read-Only Memory (ROM) and/or Random-Access Memory (RAM). As is well known in the art, ROM acts to transfer data and instructions unidirectionally to controller 304, and RAM is used typically to transfer data and instructions in a bi-directional manner. Memory block 306 may also include one or more fixed storage devices in the form of, by way of example, solid-state hard disk drives (HDDs), among other suitable forms of memory coupled bi-directionally to controller 304. Information may also reside on a removable storage medium loaded into or installed in mobile device 104 when needed. By way of example, any of a number of suitable memory cards may be loaded into mobile device 104 on a temporary or permanent basis. By way of example, mobile device 104 may also include a subscriber identification module (SIM) card 328 and a SIM card reader 330.

Controller 304 is also generally coupled to a variety of interfaces such as graphics control, video interface, input interface, output interface, and storage interface, and these interfaces in turn are coupled to the appropriate devices. Controller 304 is also coupled to a network interface 305 that allows mobile device 104, and particularly controller 304, to be coupled to another computer (e.g., device management system 102) or telecommunications network (e.g., network link 106 or enterprise network 110). More particularly, network interface 305 generally allows controller 304 to receive information from network link 106, or might output information to the network link in the course of performing various method steps described below. Communications may be sent to and from mobile device 104 via network interface 305. By way of example, incoming communications, such as a request or a response from another device (e.g., device management system 102), in the form of one or more packets, may be received from network link 106 at network interface 305 and stored in selected sections in memory block 306 for processing. Outgoing communications, such as a request or a response to another device (e.g., device management system 102), again in the form of one or more packets, may also be stored in selected sections in memory 306 and sent out to network link 106 at network interface 305. Controller 304 may access these communication packets stored in memory 306 for processing.

Electric signals (e.g., analog) may be produced by microphone 310 and fed to earpiece 311. Controller 304 may receive instruction signals from keypad 313 (which may include soft keys) and control the operation of display 316 (In alternate embodiments, keypad 313 may be implemented as a virtual keypad displayed on display 316). By way of example, display 316 may incorporate liquid crystal display (LCD), light emitting diode (LED), Interferometric modulator display (IMOD), or any other suitable display technology including touchscreen display technology. Radio signals may be transmitted and received by means of an antenna 318 that may be connected through a radio interface 320 to codec 322 configured to process signals under control of controller 304. Thus, in use for speech, codec 322 may receive signals (e.g., analog) from microphone 310, digitize them into a form suitable for transmission, and feed them to radio interface 320 for transmission through antenna 318 to, for example, a public land mobile network (PLMN). Similarly, received signals may be fed to codec 322 so as to produce signals (e.g., analog) which may be fed to ear piece 312. Mobile device 104 also generally includes a ringer (e.g., speaker) 324 and may also include light emitting diodes (LEDs) 326. In particular embodiments, mobile device 104 may be a dual mode phone having a wireless local area network (WLAN) interface, Worldwide Interoperability for Microwave Access (WiMAX) interface, and/or other wireless or physical interfaces (such as BlueTooth® and USB). Additionally, mobile device 104 may be powered by a removable battery pack 332.

Mobile device 104 may also include one or more user input devices 334 (other than keypad 313) that are operatively coupled to the controller 304. Generally, input devices 334 are configured to transfer data, commands and responses from the outside world into mobile device 108. By way of example, mobile device may include a joystick or directional pad. Input devices 334 may also include one or more hard buttons. Display device 316 is generally configured to display a graphical user interface (GUI) that provides an easy to use visual interface between a user of the mobile device 104 and the operating system or application(s) running on the mobile device. Generally, the GUI presents programs, files and operational options with graphical images. During operation, the user may select and activate various graphical images displayed on the display 316 in order to initiate functions and tasks associated therewith.

In particular embodiments, each mobile device 104 further includes a control client 312 that is configured to interact with the device management system 102 via network link 106. Control client 312 may generally be implemented as one or more software programs or applications stored in, by way of example, memory 306. In particular embodiments, client 312 is configured to download a current configuration profile generated by the device management system 102 and store the current configuration profile within a first memory location within mobile device 104 (e.g., within a first location within memory 306).

Each mobile device additionally includes a configuration manager 314 that is configured to install configuration profiles to order to apply or implement various settings as will be described in more detail below. Configuration manager 314 may also generally be implemented as one or more software programs or applications stored in, by way of example, memory 306. In particular embodiments, configuration manager 314 is also configured to download via, for example, Safari or other web browser, the current configuration profile and store the current configuration within a second memory location within the mobile device 104 (e.g., within a second location within memory 306). That is, in particular embodiments, configuration manager 314 is configured to independently download and store its own copy of the current configuration profile separate from the copy downloaded and stored by client 312.

In particular embodiments, device management system 102 is configured to generate configuration profiles (hereinafter also referred to as configuration files or configuration settings) to be installed and implemented at the mobile devices 104 using a configuration utility (or tool). By way of example, a configuration profile may be implemented as an XML file that, when installed, provides information that the mobile device (e.g., iPhone) 104 can use to connect to and communicate with the enterprise network and systems described above. In a particular embodiment, the configuration profile is implemented as a .mobileconfig file for installation by an iPhone. By way of example, corporate passcode policies and settings can be set via configuration profiles created and distributed by the enterprise IT administrator. In addition, configuration profiles can be used to remotely configure the VPN, email, and wireless network settings of each and every mobile device 104, making each mobile device 104 secure and ready for access. Configuration profiles can also be used to install certificates on a mobile device 104 for authentication to IPSec VPN servers, 802.1x-based wireless networks, and other corporate services.

In general, each configuration profile may include one or more of the following components: exchange settings, wireless settings, VPN settings, email settings, passcode policies, certificates, restrictions, and signatures. Exchange settings may include server, domain, and account information in a configuration profile so that a user of the mobile device 104 may simply provide a password to connect via, for example, a Microsoft Exchange ActiveSync server. Wireless settings may be utilized to streamline enterprise access point connections. VPN settings may be utilized to configure VPN server settings, accounts, proxies, certificates, tokens, passwords, groups, and shared secrets for enterprise private networks. Email settings may be utilized to configure IMAP or POP mail settings including incoming and outgoing mail servers. Passcode policies may be utilized to protect enterprise data by configuring and enforcing device passcode policies. Certificates may be utilized to ensure the identity of the registered user of the mobile device 104 and control access to key enterprise services such as VPN and WPA2 enterprise/802.1x networks on the mobile device. Restrictions may be used to control the installation of third-party applications. Signatures may be utilized to associate a configuration profile with an identity so the user can be sure it's coming from a trusted source.

In particular embodiments, each configuration profile includes a token that serves as a verification tool for verifying that a given configuration profile has been successfully installed by the configuration manager 314 within a particular mobile device 104. By way of example, in a particular embodiment, the token is implemented as a dummy Wi-Fi profile setting such as, by way of example, a dummy Service Set Identifier (SSID), although the verification token may be alternately be implemented as other dummy settings.

In particular embodiments, device management system 102 generates a new (current) configuration profile (including a new verification token) whenever policy changes are made at the device management system 102 or at other appropriate times. Device management system 102 then attempts to distribute the current configuration profile to one or more target mobile devices 104 such that the new version of the configuration profile replaces an existing configuration profile (if any) within each of the target mobile devices 104. By way of example, device management system 102 may store the current configuration profile at a secure site which may or may not be within one of the device management servers 108 or databases 110. In particular embodiments, client 312 and configuration manager 314 are configured to establish an HTTP or HTTPS connection with the secure site in order to access and download their respective copies of the current configuration profile.

Figure 4:
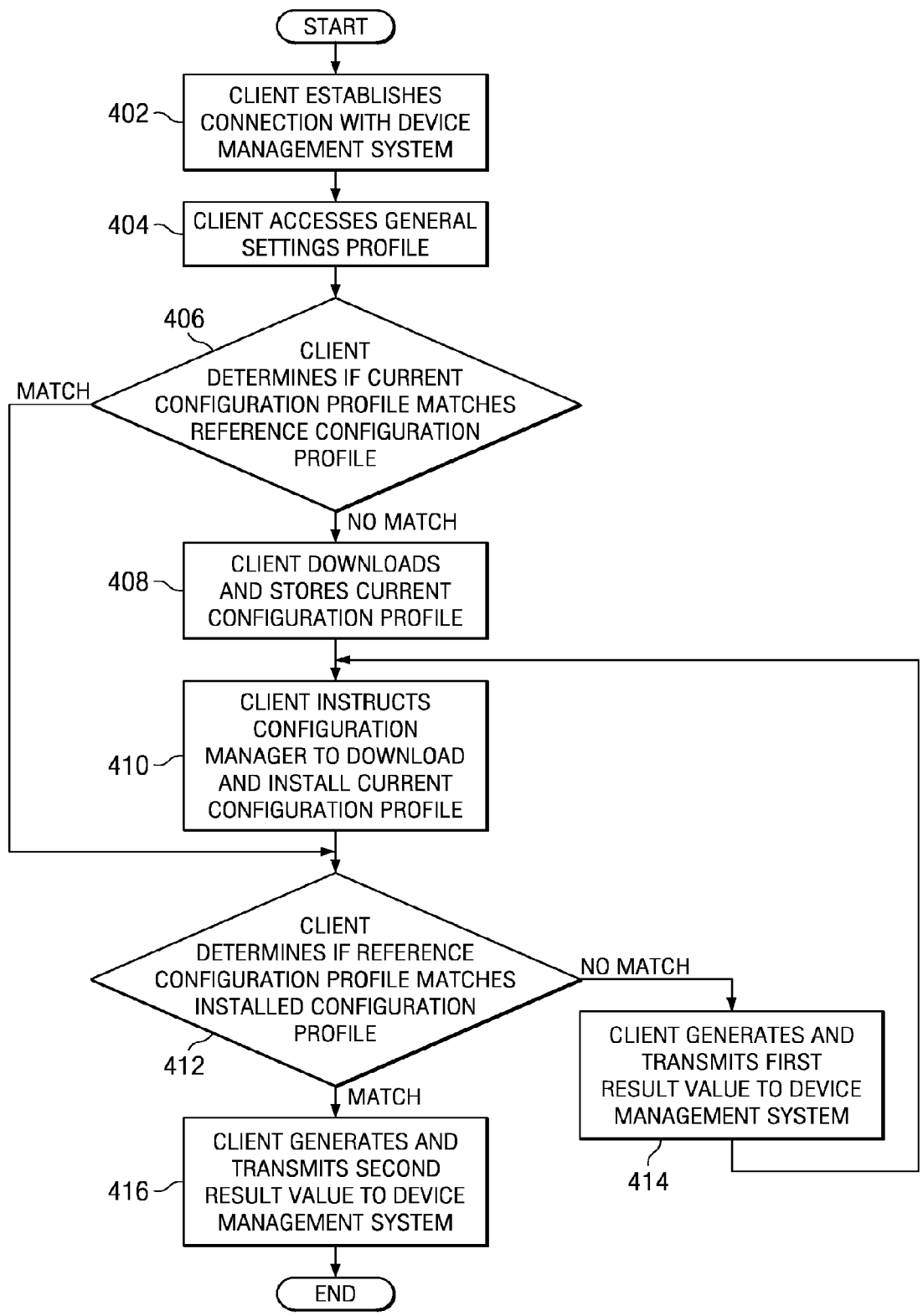
FIG. 4 illustrates a flowchart outlining an example process for updating a configuration profile.

FIG. 4 illustrates an example process for updating a configuration profile within a mobile device 104 and, in particular embodiments, verifying that the configuration profile has been successfully installed. In particular embodiments, upon launch of a client 312 in a particular mobile device, client 312 establishes, at step 402, a connection with device management system 102. By way of example, client 312 may launch automatically, upon manual launch by a user of mobile device 104, or in response to a transmission from device management system 102. In particular embodiments, after the connection is established, client 312 accesses, at step 404, a general settings profile generated by the device management system 102 for the mobile device 104. The general settings profile generally includes various settings information including a current configuration policy value. The current configuration policy value identifies the current configuration profile generated by the device management system 102 and made available to the mobile device 104. In particular embodiments, the current configuration policy value identifies a location of the current configuration profile within the secure site. By way of example, the location may be identified with a Uniform Resource Locator (URL). In particular embodiments, the URL itself identifies the current configuration profile. By way of example, the URL may include the name (e.g., version name) or other identifying indicator of the current configuration profile stored at the URL address. In particular embodiments, the device management system 102 also generates a copy of the current configuration profile and may host the copy at a different location within the secure site. The copy of the current configuration profile may be identified with a second current configuration policy value that includes a second URL identifying the location of the copy of the current configuration profile.

After client 312 accesses and views the general settings profile, the client determines, at step 406, whether the current configuration profile matches an existing configuration profile (hereinafter also referred to as "reference configuration profile") already stored by client 312 within the first memory location. By way of example, in one particular embodiment, client 312 determines, based on the first or second URL (which, as described above, may include the version name of the current configuration profile) specified within the current configuration policy value, whether the version of the current configuration profile matches the configuration profile stored within the first memory location within the mobile device 104. In such an embodiment, client 312 may make the determination of whether the current configuration profile matches the configuration profile stored within the first memory location without necessarily downloading the current configuration profile from the secure site. In alternate embodiments, client 312 may download the current configuration profile, examine the current verification token within the current configuration profile, and compare the current verification token with the verification token included within the configuration profile stored within the first memory location within the mobile device 104 in order to make the determination.

Additionally, in various embodiments, device management system 102 may also transmit a notification to client 312 notifying client 312 that a new current configuration profile is available for download. In such a case, client 312 then accesses the secure site and the current configuration profile.

If client 312 determines that the current configuration profile differs from the existing configuration profile stored within the first memory location, client 312 then accesses the second URL containing the copy of the current configuration profile and, at step 408, downloads and stores the copy of the current configuration profile within the first memory location. In this manner, the current configuration profile replaces the existing configuration profile within the first memory location. Subsequently, client 312 then instructs, at 410, configuration manager 314 to access the first URL containing the current configuration profile and to download and store the current configuration profile within the second memory location within the mobile device 104.

It should also be noted that, in various embodiments, client 312 may be configured to prompt the user of the mobile device 104 with a query as to whether or not the user would like to download the current configuration profile before client 312 and/or configuration manager 314 downloads their respective copies of the current configuration profile. Additionally, client 312 may also prompt the user for identification information in order to provide client 312 and/or configuration manager 314 with authorization information so that client 312 and/or configuration manager 314 can obtain access to the secure site.

In response to the instruction from client 312, configuration manager 314 then accesses the current configuration profile via, for example, Safari or other web browser, at the first URL and attempts to download and store the current configuration profile within the second memory location within the mobile device in order to install and apply the configuration settings within the configuration profile at the mobile device 104. It should be noted, however, that the installation of the current configuration profile is, in particular embodiments, an "all or nothing" procedure. That is, if an error occurs when attempting to download and store any portion of the current configuration profile within the second memory location, then none of the current configuration profile is installed and any pre-existing configuration profile stored within the second memory location remains. If, on the other hand, the installation is a success, then the current configuration profile replaces any pre-existing configuration profile (hereinafter also referred to as the "installed configuration profile") stored within the second memory location and the new current configuration settings within the current configuration profile are applied.

Going back, if client 312 determines that the current configuration profile is the same as the existing reference configuration profile stored within the first memory location, client 312 determines that it has the most current configuration profile. However, this does not necessarily mean that the current configuration profile has been successfully installed and applied within the mobile device 104. That is, in particular embodiments, the reference configuration profile stored by client 312 within the first memory location is effectively used as a reference copy for purposes of comparison to the configuration profile stored in the second memory location by configuration manager or to the configuration profile available at the secure site. Only the installed configuration profile stored in the second memory location by the configuration manager is actually applied to the operations of the mobile device 104. Thus, client 312 also must determine, at 412, if the installed configuration profile stored within the second memory location matches the current configuration profile. In particular embodiments, client 312 makes this second determination every time client 312 is launched. In various embodiments, client 312 may make this second determination before, after, or both before and after client 312 accesses the device management server 102 to determine if there is a new current configuration profile to download.

By way of example, if client 312 determines that the current configuration profile is the same as the reference configuration profile stored within the first memory location, client 312 then determines, at 412, whether or not the installed configuration profile (if any) stored by configuration manager 314 matches the new current configuration profile. In particular embodiments, in order to make this second determination, client 312 compares the verification token stored in the configuration profile in the second memory location by configuration manager 314 with the current verification token in the current configuration profile stored in the first memory location by client 312. If the verification tokens match, client 312 determines that configuration manager 314 has installed and applied the most current configuration profile. More particularly, because the installation of the configuration profile is an all or nothing procedure, if the most current verification token is installed in the second memory location, client 312 can definitively determine that the whole current configuration profile has been successfully installed. Similarly, if the verification tokens don't match, client 312 can definitively determine that the current configuration profile has not been installed. If the latter is the case, client 312 then instructs configuration manager 314 to access the secure site and download the current configuration profile.

In this manner, if, for some reason, configuration manager 314 failed to successfully install the current configuration profile, then, in some embodiments, neither the device management server 102 nor client 312 knows right away that the current configuration profile failed to install. However, the next time client 312 is run or launched for example (or at some subsequent time after step 410), client 312 compares the current (new reference) verification token stored within the first memory location with the installed verification token stored by the configuration manager 314 in the second memory location. As a result, client 312 can determine if the configuration profile stored in the second memory location is the current configuration profile and instruct configuration manager 314 to download and install the current configuration profile if it is not.

In particular embodiments, after client 312 determines whether or not the current verification token matches the verification token stored by the configuration manager 314 in the second memory location, client 312 is configured to generate a result value that indicates whether or not the current verification token matches the verification token in the second memory location. By way of example, a "0" may indicate that the verification tokens match whereas a "−1" may indicate that the tokens do not match. Client 312 is further configured to transmit the result value to the device management system 102 at step 414 if the verification tokens don't match or at step 416 if the tokens do match. In this manner, device management system 102 is informed as to whether or not the current configuration profile has been successfully installed and applied by configuration manager 314 in the mobile device.

In particular embodiments, device management system 102 may implement various security policies that may, by way of example, restrict access or cause other action depending on whether or not the current configuration profile has been successfully installed and applied within a particular mobile device 104. By way of example, device management system 102 may maintain an access control list (ACL) for the mobile devices 104 registered with the enterprise and update the list based on the configuration profiles installed in the mobile devies 104. The ACL may specify permissions associated with each of the mobile devices 104. When a particular mobile device 104 transmits a request to device management system or directly to an enterprise server to gain access to an enterprise virtual private network (VPN), for example, the request may be granted or denied based on whether the current configuration profile is installed in the particular mobile device. As described above, the device management system 102 determines whether the current configuration is installed based on the result value transmitted by the client 312 within the particular mobile device. Granting access to an enterprise VPN is just one example of policies or restrictions that device management system 102 may implement based on whether or not the current configuration profile is installed in the mobile device. By way of example, device management system 102 may also be configured to restrict email access, enterprise news feeds, or other enterprise applications based on whether the current configuration profile is installed.

Additionally, although in the described embodiments, the client 312 and configuration manager 314 access and download configuration profiles via a secure site over, for example, an HTTP or HTTPS connection, in alternate embodiments, client 312 and configuration manager 314 may download the current configuration profile from an email transmitted to the mobile device, among other suitable means.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
    establishing a connection between a client application hosted by a mobile device and a device management system remote from the mobile device;
    receiving, by the client application, a first current configuration profile location of a current configuration profile external to the mobile device, the current configuration profile comprising one or more current configuration settings to be installed within the mobile device and a current verification token embedded within the one or more current configuration settings;
    determining, by the client application, whether or not the current configuration profile matches a reference configuration profile including a reference verification token stored within the mobile device; and
    if the client application determines that the current configuration profile is different from the reference configuration profile:
        downloading, by the client application, a copy of the current configuration profile;
        storing the copy as the reference configuration profile within the mobile device;
        instructing, by the client application, a configuration manager within the mobile device to access, download, and install a separate copy of the current configuration profile as an installed configuration profile including an installed verification token identical to the current verification token; and
    determining, by the client application, whether or not the reference configuration profile matches the installed configuration profile stored within the mobile device based on whether the reference verification token matches the installed verification token; and
    if the client application determines that the reference verification token is different from the installed verification token:
        instructing, by the client application, the configuration manager to access, download, and install the current configuration profile as the installed configuration profile.

2. The method of claim 1, further comprising:
    in response to the instructing by the client, accessing, by the configuration manager, the current configuration profile including the current verification token;

downloading and storing, by the configuration manager, the current configuration profile within the mobile device as the installed configuration profile.

3. The method of claim 1, wherein establishing the connection between the client application and the device management system is performed whenever the client application is launched or in response to a notification from the device management system.

4. The method of claim 1, wherein the current configuration profile location is within a secure server accessible by the mobile device via an HTTPS connection between the mobile device and the secure server, wherein the current configuration profile location is specified with a URL.

5. The method of claim 1, wherein the current verification token is a dummy configuration setting, the dummy configuration setting is a dummy Wi-Fi SSID.

6. The method of claim 1, wherein the current configuration profile is a .mobileconfig file.

7. The method of claim 1, wherein the one or more configuration settings include one or more of: exchange settings, wireless settings, VPN settings, email settings, passcode policies, certificates, restrictions, and signatures.

8. The method of claim 1, further comprising:
if the client application determines that the reference verification token is different from the installed verification token:
generating, by the client application, a first result value that indicates that the reference verification token is different from the installed verification token; and
transmitting, by the client application, the first result value to the device management system; and
if the client application determines that the reference verification token is identical to the installed verification token:
generating, by the client application, a second result value that indicates that the reference verification token is identical to the installed verification token; and
transmitting, by the client application, the second result value to the device management system.

9. The method of claim 8, further comprising:
transmitting, by the client application, an access request to the device management system;
wherein the device management system determines whether or not to grant the access request based on the type of access request and whether or not the device management system receives the first result value or the second result value.

10. The method of claim 8, further comprising:
updating, by the device management system, an access control list (ACL) based on the first or second result value.

11. The method of claim 9, wherein the access request comprises a request to access an enterprise virtual private network.

12. A mobile device, comprising:
a processor; and
a memory coupled with the processor, wherein the memory is configured to provide the processor with instructions which when executed cause the processor to:
establish a connection between a client application hosted by the mobile device with a device management system remote from the mobile device;
receive a first current configuration profile location of a current configuration profile external to the mobile device, the current configuration profile comprising one or more current configuration settings to be installed within the mobile device and a current verification token embedded within the one or more current configuration settings;
determine, by the client application, whether or not the current configuration profile matches a reference configuration profile including a reference verification token stored within the mobile device; and
if the client application determines that the current configuration profile is different from the reference configuration profile:
download, by the client application, a copy of the current configuration profile;
store the copy as the reference configuration profile within the mobile device;
instruct, by the client application, a configuration manager within the mobile device to access, download, and install a separate copy of the current configuration profile as an installed configuration profile including an installed verification token identical to the current verification token; and
determine, by the client application, whether or not the reference configuration profile matches the installed configuration profile stored within the mobile device based on whether the reference verification token matches the installed verification token; and
if the client application determines that the reference verification token is different from the installed verification token:
instruct, by the client application, the configuration manager to access, download, and install the current configuration profile as the installed configuration profile.

13. The mobile device of claim 12, further comprising:
in response to the instructing by the client, access, by the configuration manager, the current configuration profile including the current verification token;
download and store, by the configuration manager, the current configuration profile within the mobile device as the installed configuration profile.

14. The mobile device of claim 12, wherein to establish the connection between the client application and the device management system is performed whenever the client application is launched or in response to a notification from the device management system.

15. The mobile device of claim 12, wherein the current configuration profile location is within a secure server accessible by the mobile device via an HTTPS connection between the mobile device and the secure server, wherein the current configuration profile location is specified with a URL.

16. The mobile device of claim 12, wherein the one or more configuration settings include one or more of: exchange settings, wireless settings, VPN settings, email settings, passcode policies, certificates, restrictions, and signatures.

17. The mobile device of claim 12, further comprising:
if the client application determines that the reference verification token is different from the installed verification token:
generate, by the client application, a first result value that indicates that the reference verification token is different from the installed verification token; and
transmit, by the client application, the first result value to the device management system; and
if the client application determines that the reference verification token is identical to the installed verification token:

generate, by the client application, a second result value that indicates that the reference verification token is identical to the installed verification token; and transmit, by the client application, the second result value to the device management system.

18. The mobile device of claim 17, further comprising:

transmit, by the client application, an access request to the device management system;

wherein the device management system determines whether or not to grant the access request based on the type of access request and whether or not the device management system receives the first result value or the second result value.

19. A computer program product, the computer program product being embodied in a non-transitory computer readable medium and comprising computer instructions for:

establishing a connection between a client application hosted by a mobile device and a device management system remote from the mobile device;

receiving, by the client application, a first current configuration profile location of a current configuration profile external to the mobile device, the current configuration profile comprising one or more current configuration settings to be installed within the mobile device and a current verification token embedded within the one or more current configuration settings;

determining, by the client application, whether or not the current configuration profile matches a reference configuration profile including a reference verification token stored within the mobile device; and if the client application determines that the current configuration profile is different from the reference configuration profile:

downloading, by the client application, a copy of the current configuration profile;

storing the copy as the reference configuration profile within the mobile device;

instructing, by the client application, a configuration manager within the mobile device to access, download, and install a separate copy of the current configuration profile as an installed configuration profile including an installed verification token identical to the current verification token; and determining, by the client application, whether or not the reference configuration profile matches the installed configuration profile stored within the mobile device based on whether the reference verification token matches the installed verification token; and if the client application determines that the reference verification token is different from the installed verification token:

instructing, by the client application, the configuration manager to access, download, and install the current configuration profile as the installed configuration profile.

20. The computer program product of claim 19, further comprising:

in response to the instructing by the client, accessing, by the configuration manager, the current configuration profile including the current verification token;

downloading and storing, by the configuration manager, the current configuration profile within the mobile device as the installed configuration profile.

* * * * *